L. A. THOMPSON.
MIXING APPARATUS.
APPLICATION FILED APR. 14, 1913.

1,087,152.

Patented Feb. 17, 1914.

Witnesses:

Inventor:
Livingston A. Thompson
By Olyphant Young
Attorneys.

UNITED STATES PATENT OFFICE.

LIVINGSTON A. THOMPSON, OF MILWAUKEE, WISCONSIN.

MIXING APPARATUS.

1,087,152.  Specification of Letters Patent. Patented Feb. 17, 1914.

Application filed April 14, 1913. Serial No. 761,046.

*To all whom it may concern:*

Be it known that I, LIVINGSTON A. THOMPSON, a citizen of the United States, and resident of Milwaukee, in the county of Milwaukee and State of Wisconsin, have invented certain new and useful Improvements in Mixing Apparatus; and I do hereby declare that the following is a full, clear, and exact description thereof.

The primary object of my invention is to provide a simple, economical and effective mixing apparatus, the same being particularly designed for mixing beverages to order in public refreshment dispensaries, it being understood that the apparatus may be also used in connection with the culinary art.

Specific objects of my invention are to provide a portable liquid container or vessel, carrying a spindle in its bottom, which spindle has permanently attached an agitator that is disposed within the vessel and also a propeller for the agitator, the same being arranged below the bottom of said vessel; to provide a base having a cavity therein, about which cavity there is arranged a rim for nested engagement with the container bottom, whereby these two separable members in conjunction form a fluid chamber, and to provide a fluid nozzle in conjunction with the base, whereby fluid under pressure is directed against the propeller, and also to provide the base with a suitable exhaust aperture or discharge.

I am aware that devices of this type have been utilized wherein electric energy is employed for imparting motion to the generator, the energy being controlled by a suitable connection effected through engagement of a base and a liquid container. The utility of this type of device, however, is limited, due to the fact that in a majority of instances, the necessary electrical current for operating said device is not accessible. Hence my apparatus is arranged to meet the more general requirements, it being understood that said device is to be operated more particularly by water under pressure, which is generally accessible in most localities, although it is understood that I may, without departing from the spirit of my invention, utilize other fluids for accomplishing the desired result.

With the above objects in view the invention consists in certain peculiarities of construction and combination of mechanical elements as hereinafter fully set forth with reference to the accompanying drawings and subsequently claimed.

Figure 1:
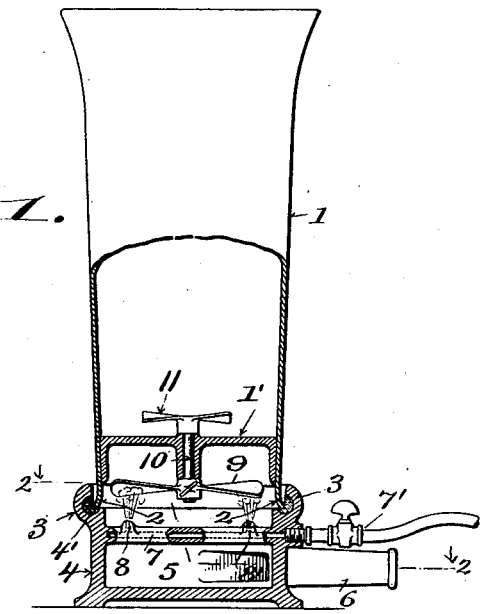
Figure 2:
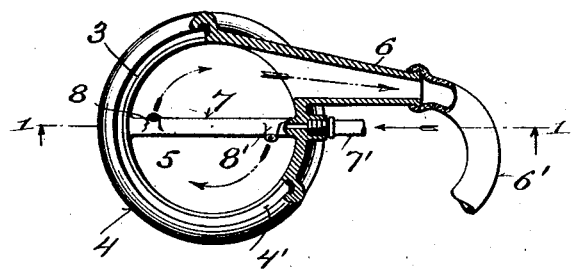

In the drawings Figure 1 represents a partly sectional elevation of a mixing apparatus embodying the features of my invention, the section being indicated by line 1—1 of Fig. 2, and Fig. 2, a plan view of the base member of the mixing apparatus, the same being shown partly in section as indicated by line 2—2 of Fig. 1.

Referring by characters to the drawings, 1 represents a portable vessel or container having a valanced or flanged bottom 1', the lower edge 2 of the flange being suitably turned to form a finished tight joint in connection with a rim 3 of a base-member 4, which base-member is hollowed as shown, within the confines of the rim, to provide a fluid-receiving cavity 5 that is formed in conjunction with the inverted cupped bottom of the container. The fluid-receiving cavity has extending from its walls a tangentially disposed exhaust nozzle 6 that may be connected by a flexible pipe 6' to a waist, which exhaust connections form no part of my invention. Extending across the fluid chamber 5 is a hollow web 7 having oppositely disposed discharge nozzles 8, 8', through which nozzles fluid is directed to the blades of a propeller 9 that is disposed thereabove, the same being hereinafter more particularly described. Fluid is supplied to the web 7 and its nozzles by means of a suitable valve-controlled pipe connection 7' that is tapped to any convenient source of supply. The rim 4 of the base, as shown, is preferably provided with a suitable gasket 4', which gasket serves to form a more perfect seat for the container valance or flanged edge.

Journaled in the bottom 1' of the container is a spindle 10, to the lower end of which spindle the propeller is secured. The upper end of the spindle extends into the bottom of the vessel and carries an agitator 11, whereby the contents of the vessel are thoroughly mixed, the said agitator being centrally disposed therein.

From the foregoing description it is apparent that the portable container or vessel 1, when filled with the ingredients to be mixed, is thereafter seated upon the rim 4 of the base, whereby a tight joint is formed between the bottom flange of said vessel and the chambered portion 5 of the base.

Thereafter power is applied to the propeller 9 by manipulation of the valve carried by the feed or supply pipe 7', whereby the fluid is discharged in opposite directions through the nozzles 8 and 8', the jets being directed against the vanes or blades of the propeller, to thus cause rapid rotation thereof, the spindle and the agitator being thereby revolved to effect the desired mixing operation. The thin jets of fluid discharged from the nipples are exhausted from the fluid chamber through the exhaust nozzle 6' and when the mixing operation has been completed the valve in pipe 7 is turned, to cut off the supply. Thereafter the vessel or container can be removed and emptied of its contents, particular attention being called to the fact that the propeller is disposed above the plane of the lower edge 2 of the container valance or flange, whereby the said container can be supported upon its bottom without liability of the propeller coming in contact with the counter or table, upon which the aforesaid container rests when not seated upon the base.

I claim:

1. A mixer comprising a separable container having an integral bottom and a base member, the container bottom being arranged to fit upon the base to form a closed fluid chamber in conjunction therewith, means in connection with the base for admitting fluid to the chamber under pressure and for exhausting said fluid therefrom, an agitator revolubly mounted within the container, a propeller revolubly mounted within the chamber, and connecting means for the agitator and propeller extending through the container bottom.

2. A mixing apparatus comprising a portable container having a flanged bottom, a spindle extending through the bottom, an agitator carried by the spindle, the same being within the container, a propeller secured to the spindle below the container bottom, a hollow base member having a rim adapted to receive the container flange whereby a closed chamber is formed between the base and said flange, and means in connection with the base for admitting fluid under pressure to the chamber and exhausting said fluid therefrom.

3. A mixing apparatus comprising a container having a rotatory agitator therein, a stem carried by the agitator and extending through the bottom of said container, a propeller secured to the stem, a seating flange extending from the container bottom about the propeller and below the plane of the same, a hollow base having a rim adapted to receive the container flange whereby a tight joint is formed between the base and said container, and means for admitting and exhausting fluid to and from the hollow base.

4. A mixing apparatus comprising a container having an inverted cupped bottom, a spindle journaled in the bottom, an agitator disposed within the container and carried by the spindle, a propeller arranged within the cupped bottom portion of said container and secured to the spindle, a hollow base having a rim for seating engagement with the edge of the cupped bottom of said container, a discharge nozzle carried by the container for directing fluid under pressure to the inclosed propeller, and means for exhausting said fluid from the base.

In testimony that I claim the foregoing I have hereunto set my hand at Milwaukee in the county of Milwaukee and State of Wisconsin in the presence of two witnesses.

LIVINGSTON A. THOMPSON.

Witnesses:
GEO. W. YOUNG,
M. E. DOWNEY.